(12) United States Patent
Davis et al.

(10) Patent No.: US 11,443,110 B2
(45) Date of Patent: *Sep. 13, 2022

(54) EDITABLE TABLE IN A SPREADSHEET INTEGRATED WITH A WEB SERVICE

(71) Applicant: Oracle International Corporation, Redwood Shores, CA (US)

(72) Inventors: Edmund A. Davis, San Mateo, CA (US); Brian Rowles, Acton, MA (US); Shaun Logan, Melrose, MA (US); Kelsey Von Tish, Boston, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,411

(22) Filed: Jul. 28, 2021

(65) Prior Publication Data

US 2021/0357582 A1 Nov. 18, 2021

Related U.S. Application Data

(63) Continuation of application No. 16/145,029, filed on Sep. 27, 2018, now Pat. No. 11,138,371.

(Continued)

(51) Int. Cl.
| | |
|---|---|
| *H04L 67/51* | (2022.01) |
| *G06F 40/18* | (2020.01) |
| *G06F 16/907* | (2019.01) |
| *G06F 16/958* | (2019.01) |
| *G06F 40/177* | (2020.01) |
| *H04L 67/50* | (2022.01) |

(Continued)

(52) U.S. Cl.
CPC ............ *G06F 40/18* (2020.01); *G06F 16/907* (2019.01); *G06F 16/958* (2019.01); *G06F 40/177* (2020.01); *H04L 67/51* (2022.05); *H04L 67/535* (2022.05); *H04L 67/561* (2022.05); *H04L 67/565* (2022.05)

(58) Field of Classification Search
CPC .... G06F 16/907; G06F 16/958; G06F 40/177; G06F 40/18; H04L 67/51; H04L 67/535; H04L 67/561; H04L 67/565
See application file for complete search history.

(56) References Cited

U.S. PATENT DOCUMENTS

| | | | |
|---|---|---|---|
| 6,134,564 A | 10/2000 | Listou | |
| 8,205,010 B1 * | 6/2012 | Black | G06Q 10/00 709/246 |

(Continued)

*Primary Examiner* — Gil H. Lee
(74) *Attorney, Agent, or Firm* — Trellis IP Law Group, PC

(57) ABSTRACT

Implementations generally relate to an editable table in a spreadsheet integrated with a web service. In some implementations, a method includes obtaining web service metadata from a web service. The method further includes determining one or more capabilities of the web service based on the web service metadata. The method further includes configuring a table component in a spreadsheet based on the one or more capabilities and the web service metadata. The method further includes retrieving data from the web service. The method further includes converting the data to a predetermined format. The method further includes tracking data changes in the spreadsheet based on user input. The method further includes sending the data changes from the spreadsheet to the web service.

20 Claims, 17 Drawing Sheets

Related U.S. Application Data

(60) Provisional application No. 62/566,248, filed on Sep. 29, 2017, provisional application No. 62/564,938, filed on Sep. 28, 2017.

(51) Int. Cl.
*H04L 67/561* (2022.01)
*H04L 67/565* (2022.01)

(56) References Cited

U.S. PATENT DOCUMENTS

| | | |
|---|---|---|
| 8,566,915 B2 | 10/2013 | Hsueh et al. |
| 8,972,726 B1 | 3/2015 | Poling |
| 9,426,140 B2 | 8/2016 | Palmeri et al. |
| 9,438,588 B2 | 9/2016 | Yefimov et al. |
| 9,699,161 B2 | 7/2017 | Ducker et al. |
| 10,021,091 B2 | 7/2018 | Yang et al. |
| 2003/0074188 A1* | 4/2003 | Murata ............... G09B 19/04 704/9 |
| 2004/0172592 A1* | 9/2004 | Collie ............... G06F 40/131 715/234 |
| 2006/0218156 A1* | 9/2006 | Schechinger ........ G06F 16/951 |
| 2006/0288267 A1 | 12/2006 | DeSpain |
| 2007/0033536 A1 | 2/2007 | Rasmussen |
| 2009/0037223 A1 | 2/2009 | Green et al. |
| 2010/0211862 A1* | 8/2010 | Parish ............... G06F 16/957 707/E17.014 |
| 2014/0149836 A1* | 5/2014 | Bedard ............... G06F 40/18 715/212 |
| 2015/0089351 A1 | 3/2015 | Logan et al. |
| 2018/0157467 A1* | 6/2018 | Stachura ............... G06F 8/30 |
| 2018/0365289 A1* | 12/2018 | Brown ............... G06F 21/55 |

\* cited by examiner

Example Payload: Employee Data (JSON)

```
{
  "items" : [ {
    "EmployeeId" : 100,
    "FirstName" : "Steven",
    "LastName" : "King",
    "Email" : "SKING",
    "PhoneNumber" : "515.123.4567",
    "HireDate" : "2003-06-17",
    "JobId" : "AD_PRES",
    "Salary" : 24000,
    "CommissionPct" : null,
    "ManagerId" : null,
    "DepartmentId" : 90
  }, {
    "EmployeeId" : 109,
    "FirstName" : "Daniel",
    "LastName" : "Faviet",
    "Email" : "DFAVIET",
    "PhoneNumber" : "515.124.4169",
    "HireDate" : "2005-09-01",
    "JobId" : "FI_ACCOUNT",
    "Salary" : 9000,
    "CommissionPct" : null,
    "ManagerId" : 108,
    "DepartmentId" : 100
  }, ... ]
}
```

Example Payload: Job Data (JSON)

```
{
  "items" : [ {
    "JobId" : "AD_PRES",
    "JobTitle" : "President"
  }, {
    "JobId" : "FI_ACCOUNT",
    "JobTitle" : "Accountant"
  }, {
    "JobId" : "AC_MGR",
    "JobTitle" : "Accounting Manager"
  }, ... ]
}
```

| Hire Date* | Job Title* | Salary | Commission % | Manager Id | Department |
|---|---|---|---|---|---|
| 6/17/2003 | President | 24,000.00 | | | Executive |
| 9/1/2005 | Accountant | 9,000.00 | | 108 | Finance |

| Change | Status | Id* | First Name | Last Name* | Hire Date* | Job Title* | Salary |
|---|---|---|---|---|---|---|---|
| Update | | 109 | Daniel | Faviet | 8/6/2005 | Accounting Manager | 10,000.53 |

Sample Payload: Modified Employee Data (JSON)

```
{
  "EmployeeId" : 109,
  "FirstName" : "Daniel",
  "LastName" : "Faviet",
  "Email" : "DFAVIET",
  "PhoneNumber" : "515.124.4169",
  "HireDate" : "2005-09-05",     ← Changed Value
  "JobId" : "AC_MGR",            ← Changed Value
  "Salary" : 10000.53,           ← Changed Value
  "CommissionPct" : null,
  "ManagerId" : 108,
  "DepartmentId" : 100
}
```

| Change Status | Id* | First Name | Last Name* | Hire Date* | Job Title* | Salary |
|---|---|---|---|---|---|---|
| Update Succeeded | 100 | Daniel | Faviet | 8/5/2005 | Accounting Manager | 10,000.93 |

| B | C | | D | E |
|---|---|---|---|---|
| | | 19 | | 27 |
| President | AD_PRES | | Administration | 10 |
| Administration Vice P | AD_VP | | Marketing | 20 |
| Administration Assist | AD_ASST | | Purchasing | 30 |
| Finance Manager | FI_MGR | | Human Resources | 40 |
| Accountant | FI_ACCOUNT | | Shipping | 50 |
| Accounting Manager | AC_MGR | | IT | 60 |
| Public Accountant | AC_ACCOUNT | | Public Relations | 70 |
| Sales Manager | SA_MAN | | Sales | 80 |
| Sales Representative | SA_REP | | Executive | 90 |
| Purchasing Manager | PU_MAN | | Finance | 100 |
| Purchasing Clerk | PU_CLERK | | Accounting | 110 |
| Stock Manager | ST_MAN | | Treasury | 120 |
| Stock Clerk | ST_CLERK | | Corporate Tax | 130 |
| Shipping Clerk | SH_CLERK | | Control And Credit | 140 |
| Programmer | IT_PROG | | Shareholder Services | 150 |
| Marketing Manager | MK_MAN | | Benefits | 160 |
| Marketing Represent | MK_REP | | Manufacturing | 170 |
| Human Resources R | HR_REP | | Construction | 180 |
| Public Relations Rep | PR_REP | | Contracting | 190 |
| | | | Operations | 200 |
| | | | IT Support | 210 |
| 1304 | 1302 | | NOC | 220 |
| | | | IT Helpdesk | 230 |
| | | | Government Sales | 240 |
| | | | Retail Sales | 250 |
| | | | Recruiting | 260 |
| | | | Payroll | 270 |

EDITABLE TABLE IN A SPREADSHEET INTEGRATED WITH A WEB SERVICE

CROSS REFERENCES TO RELATED APPLICATIONS

This application is a continuation of U.S. patent application Ser. No. 16/145,029, entitled EDITABLE TABLE IN A SPREADSHEET INTEGRATED WITH A WEB SERVICE, filed on Sep. 27, 2018 (ORACP0205/ORA180186-US-NP) which claims priority from U.S. Provisional Patent Application No. 62/564,938, entitled EDITABLE TABLE IN A SPREADSHEET INTEGRATED WITH A WEB SERVICE, filed on Sep. 28, 2017 (ORACP0205P/ORA180186-US-PSP), and from U.S. Provisional Patent Application No. 62/566,248, entitled TABLE CELL EDITING IN A SPREADSHEET USING A CONSTRAINED LIST OF VALUES FROM A WEB SERVICE, filed on Sep. 29, 2017 (ORACP0233P/ORA180333-US-PSP), which are hereby incorporated by reference as if set forth in full in this application for all purposes.

This application is related to U.S. patent application Ser. No. 16/692,634, entitled TABLE CELL EDITING IN A SPREADSHEET CONSTRAINED TO UNBOUNDED AND SEARCHABLE LISTS OF VALUES FROM WEB SERVICE, filed on Nov. 22, 2018 (ORACP0205CIP1/ORA200010-US-CIP-1) which is hereby incorporated by reference as if set forth in full in this application for all purposes.

BACKGROUND

Business users typically want to access and edit their business data using a spreadsheet. Conventional web services offer to retrieve business data and display the business data in a spreadsheet. However, if a business user wants to make changes to the spreadsheet, extensive and highly-skilled programming is required to transmit the changes back to the web service.

SUMMARY

Implementations generally relate to a spreadsheet add-in that enables business users with no previous programming experience to rapidly integrate spreadsheets with web applications in order to retrieve, analyze, and edit data.

In some implementations, a method includes obtaining web service metadata from a web service. The method further includes determining one or more capabilities of the web service based on the web service metadata. The method further includes configuring a table component in a spreadsheet based on the one or more capabilities and the web service metadata. The method further includes retrieving data from the web service. The method further includes converting the data to a predetermined format. The method further includes tracking data changes in the spreadsheet based on user input. The method further includes sending the data changes from the spreadsheet to the web service.

A further understanding of the nature and the advantages of particular embodiments disclosed herein may be realized by reference of the remaining portions of the specification and the attached drawings.

BRIEF DESCRIPTION OF THE DRAWINGS

FIG. 5 illustrates example payload employee data retrieved from a web service, according to some implementations.

FIG. 6 illustrates example payload job data retrieved from a web service, according to some implementations.

FIG. 7 illustrates example fields of a spreadsheet with converted display values, according to some implementations.

FIG. 9 illustrates example fields of a spreadsheet with changed display values, according to some implementations.

FIG. 10 illustrates an example package of converted display values in a JSON format, according to some implementations.

FIG. 11 illustrates example fields of the spreadsheet of FIG. 9 with changed display values and an update succeeded indicator, according to some implementations.

FIG. 13 illustrates two examples of constrained lists of display and ID values, according to some implementations.

FIG. 14 illustrates example portion of a spreadsheet, according to some implementations.

DETAILED DESCRIPTION OF EMBODIMENTS

Figure 1:
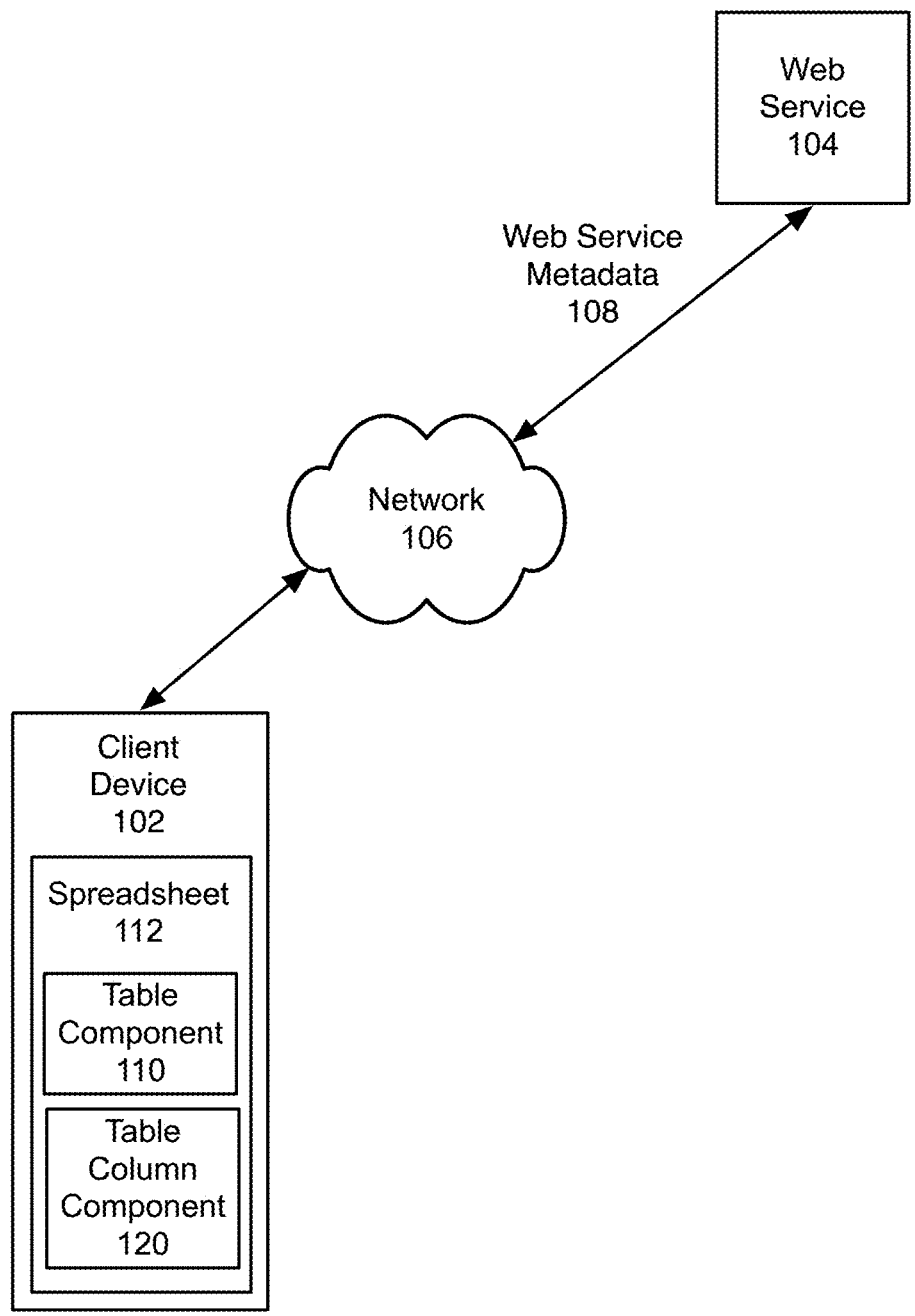
FIG. 1 illustrates a block diagram of an example application environment, which may be used for implementations described herein.

Implementations generally relate to a spreadsheet add-in that enables business users with no previous programming experience to rapidly integrate spreadsheets with web applications in order to retrieve, analyze, and edit data. Implementations interrogate a given web service to obtain its metadata. Implementations analyze the web service metadata to determine the capabilities of the web service. This metadata may then be used to automatically configure an editable table component in a spreadsheet. This table component may then be used to retrieve data, edit that data in a spreadsheet, and then upload changes back to the web service.

As described in more detail herein, a system interrogates a given web service to obtain its metadata. The system then determines one or more capabilities of the web service based on the web service metadata. The system then configures a table component in a spreadsheet based on one or more capabilities and the web service metadata. The table component may be used to retrieve data, edit that data in a spreadsheet, and then upload changes back to the web service. In various implementations, the system tracks data changes in the spreadsheet based on user input. The system then sends the data changes from the spreadsheet to the web service.

In addition to retrieving and analyzing web service metadata, implementations automatically configure the table component based on the metadata. As described in more detail herein, in various implementations, the system leverages the web service metadata and the table configuration to provide a user with automatically formatted information, and conveniently uploads changes to the information from the spreadsheet to the web service.

Other implementations generally relate to a spreadsheet add-in that provides a constrained list of display values from a web service. The spreadsheet add-in interrogates a given web service to obtain its metadata. The metadata is then used to automatically configure a table column component in a spreadsheet. For table columns whose attribute values are constrained to a list of allowable data values, the column component automatically constrains the list of display values that are displayed in cells and that may be chosen for the cells. The table column then maps those chosen display values to a corresponding set of data values that are sent back to the web service.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates a block diagram of an example application environment 100, which may be used for implementations described herein. Shown are a client device 102 and a web service 104, which may communicate with each other via a network 106. In various implementations, client device 102 runs an application for spreadsheets. As such, client device 102 may create and process spreadsheets such as spreadsheet 112, which includes a table component 110 and table column component 120. In various implementations, client device 102 may access services and data directly from web service 104. Example implementations associated with application environment 100 are described in more detail herein.

For ease of illustration, FIG. 1 shows one block for each of client device 102, web service 104, and network 106. These blocks 102, 104, and 106 may represent multiple client devices, web services, and networks. While the client device 102 performs embodiments described herein, in other embodiments, any suitable component or combination of components associated with client device 102 or any suitable processor or processors associated with client device 102 may facilitate performing the embodiments described herein. In various embodiments, the environment 100 may not have all of the components shown and/or may have other elements including other types of components instead of, or in addition to, those shown herein.

Figure 2:
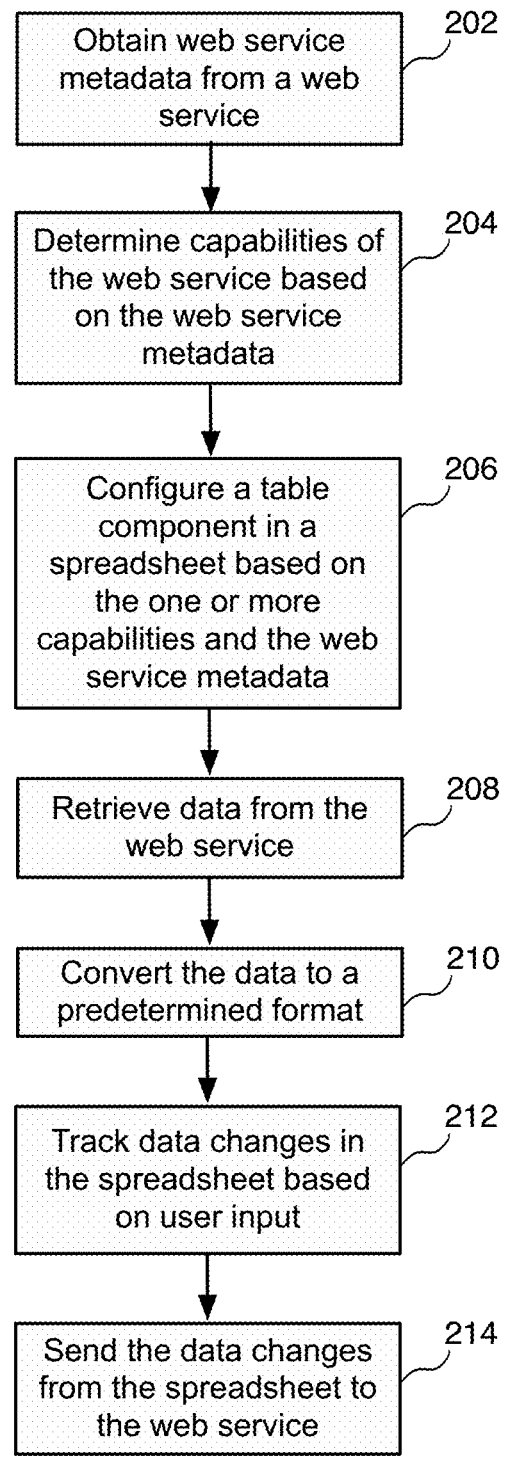
FIG. 2 illustrates an example flow diagram for editing spreadsheets, according to some implementations.
Figure 4:
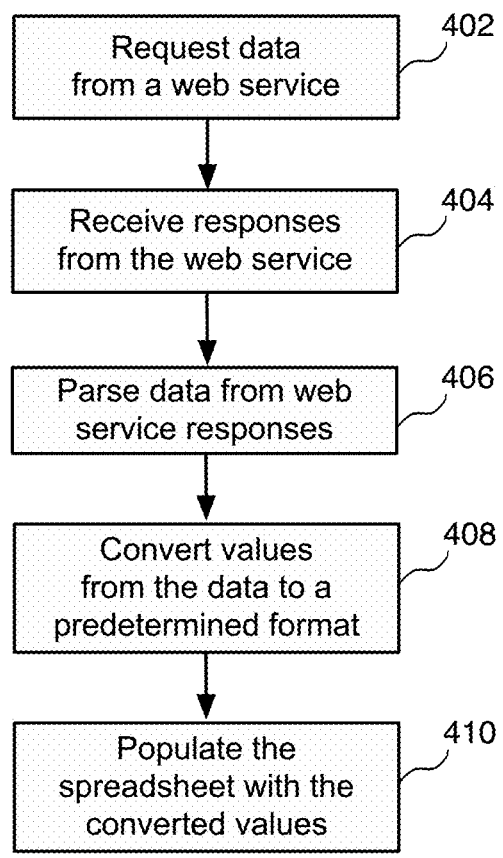
FIG. 4 illustrates an example flow diagram for downloading data to a spreadsheet, according to some implementations.

FIG. 2 illustrates an example flow diagram for editing a spreadsheet, according to some implementations. As described in more detail herein, implementations enable users with no previous programming experience to rapidly integrate spreadsheets with web applications in order to retrieve, analyze, and edit data. Implementations enable users to create and use ad-hoc graphical user interfaces (GUIs) in a spreadsheet without any dependency on web application development teams to create the GUI. FIG. 2 generally describes operations of both a development phase (e.g., blocks 202 to 206) and a runtime phase (e.g., blocks 208 to 214), where a spreadsheet that is configured to receive data from a web service and configured to present data to a user in a user-friendly format. FIG. 4 describes operations of a runtime phase, where the spreadsheet receives data from the web service and presents the data to the user.

At block 202, the system such as client device 102 obtains web service metadata 108 from web service 104. In some implementations, client device 102 may contact web service 104 via a uniform resource locator (URL). In some implementations, the URL may be provided by a user. For example, a user may enter the URL in an application programming interface (API) URL.

In various implementations, client device 102 interrogates web service 104 to obtain web service metadata 108. In various implementations, web service metadata 108 provides a description of what services and resources (also referred to as business objects) that web service 104 provides. Sets of multiple resources or business objects may also be referred to as resource collections. For example, a resource collection may involve employee information (e.g., employee resource collection). In another example, an employee resource collection may include employee information such as first name, last name, email, phone number, hire date, job title, salary, department, etc. While example implementations are described herein in the context of employee information, implementations described herein may apply to other types of resources collections such as sales information, inventory information, weather information, etc.

In some implementations, web service 104 may be a representational state transfer (REST) service. In various implementations, a REST or RESTful service provides interoperability between computer systems on the Internet. REST-compliant web services enable requesting systems such as client device 102 to access and manipulate textual representations of web resources using a uniform and predefined set of stateless operations. In various implementations, client device 102 sends a request to web service 104 requesting metadata 108, and web service 104 responds to client device 102 by sending metadata 108 to client device 102.

At block 204, the system determines one or more capabilities of web service 104 based on web service metadata 108. In various implementations, the system analyzes web service metadata 108 to determine one or more capabilities of web service 104. In some implementations, the capabilities of web service 104 are indicated in web service metadata 108. In various implementations, one or more of the capabilities of web service 104 may include the capability of providing different types of data or attributes for a spreadsheet. For example, web service 104 may provide data to the spreadsheet (e.g., an empty table) at client device 102. In another example, web service 104 may provide attributes for the spreadsheet, where an attribute may have particular properties that govern the behavior of the spreadsheet various implementations. For example, properties may include whether data in a field can be changed, whether data is mandatory, etc. In some implementations, attributes may be associated with an employee. Note that the terms "attribute," "resource attribute," "field," and "business object field" may be used interchangeably. In some implementations, attributes may include first name, last name, email address, etc.

In some implementations, properties may include whether a user can insert new entries, update existing entries, whether particular data is read-only, etc. The terms "properties" and "resource properties" may be used interchangeably. In some implementations, an attribute such as employee identification (ID) may be created when a new record associated with an employee is created, and may be read-only when updating an existing employee. In some implementations, resource properties indicated in metadata may exist at the attribute (field) level and also at the resource collection level. For example, an employee resource collection may support (or not support) a delete operation that would allow an existing employee to be deleted from the web service.

As described in more detail herein, in various implementations, these capabilities govern the behavior of a table component and columns associated with the table component during run time.

In some implementations, client device 102 displays the capabilities to a user such as an administrator. As described in more detail herein, implementations may enable the user to make some modifications to the information. For example, as described in more detail herein, implementations may enable a user to add or remove columns, or enable a user to change the wording (label) of a (column) header, etc.

At block 206, the system configures a table component 110 in a spreadsheet 112 based on the one or more capabilities and web service metadata 108. In some implementations, to configure table component 110 in spreadsheet 112, the system automatically configures, without user intervention, table component 110 based on web service metadata 108. As indicted herein, in various implementations, web service metadata 108 indicates attributes and properties associated with the attributes. Table component 110 includes these attributes, properties that govern characteristics such as formatting, styling, etc., and table component 110 applies the attributes and properties to particular cells in a spreadsheet. Example implementations are described in more detail herein in connection with FIG. 3.

In some implementations, configuring table component 110 based on web service metadata 108 enables table component 110 in the spreadsheet to map attributes (e.g., first name, last name, email address, etc.) to columns of a spreadsheet when table component 110 is inserted into the spreadsheet.

Figure 3:
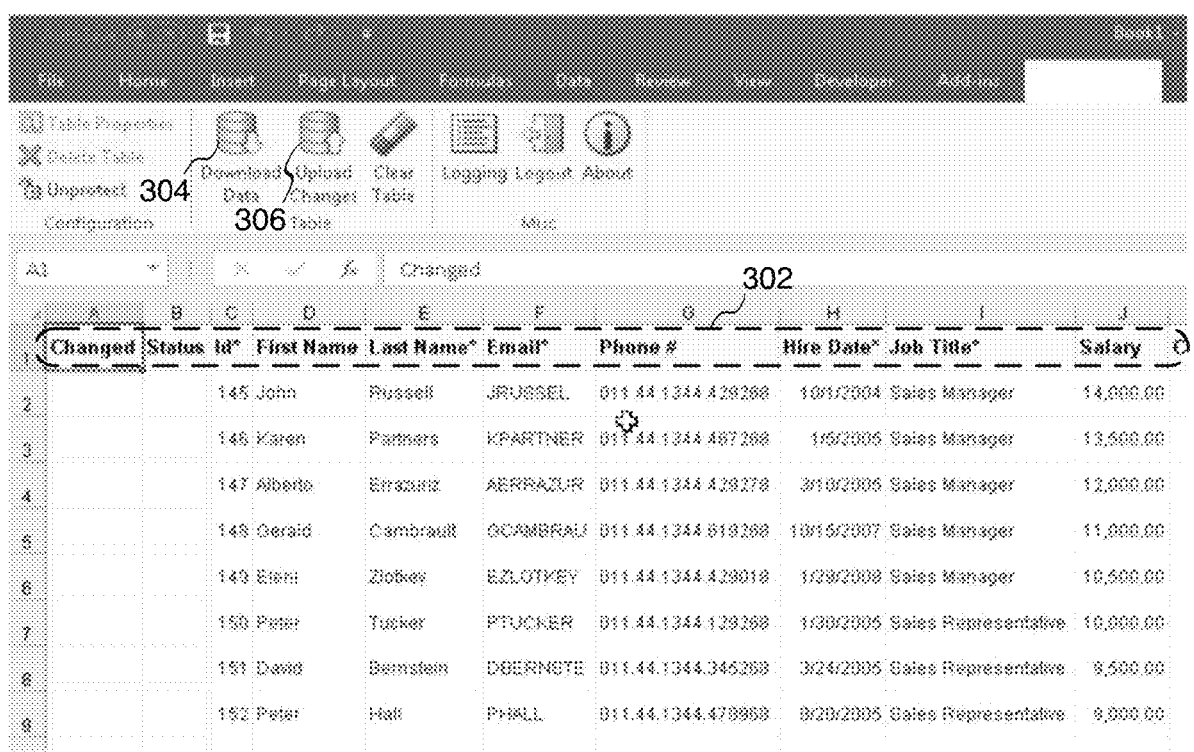
FIG. 3 illustrates an example spreadsheet, according to some implementations.

FIG. 3 illustrates example spreadsheet 112 of FIG. 1, according to some implementations. In various implementations, the system configures table component 110 in the spreadsheet to automatically render columns and fields, and to populate the cells associated with attributes (fields) with data in a particular format. For example, shown are headers 302, where each header indicates a particular type of information or attributes such as first name, last name, email, phone number, hire date, job title, salary, etc. During the configuration process, the table component 110 maps the attributes to particular columns, as well as applying formatting to specific fields in the columns of spreadsheet 112.

An example header shown is Phone #, which may be referred to as a display name (or label). The display name Phone #may correspond to a field name (identifier), PhoneNumber, provided by web service 104. In various implementations, table component 110 automatically renders a more readable displayed name (e.g., Phone #) rather than a potentially less readable field name (e.g., PhoneNumber). Also, shown is a symbol such as an asterisk (e.g., "*"), which indicates to the user that the data in the field is mandatory.

In some implementations, particular attributes may have read-only properties. For example, phone numbers may be read-only, which means the end user cannot change phone numbers and may only view them. In some implementations, table component 110 may visually indicate to the user that particular columns are read-only. For example, table component 110 may show fields in a particular column (e.g., the phone number column) in a different color or darker than other columns. In addition to formatting, implementations activate a spreadsheet's ability to prevent the user from altering the contents of certain cells. For example, each cell may have a "locked" property. In some implementations, a worksheet may be protected and locked cells cannot be edited. Some implementations may handle both the locked properties of cells and a protection mode of worksheets automatically based on web service metadata.

In various implementations, spreadsheet 112 may include a download data button 304 for downloading data from a particular source such as web service 104. As described in more detail herein, during runtime, in response to the user selecting download data button 304, the system proceeds to retrieve data from web service 104. In various implementations, table component 110 automatically applies attributes such as formatting, as well as functions to data when the data is downloaded to the spreadsheet. For example, the words in the header may be automatically rendered in a particular font and bolded in order to be distinguished from information under the headers. In various implementations, table component 110 determines what information is numbers, dates, strings, etc., and applies attributes accordingly. As described in more detail herein, table component 110 automatically applies formatting, including styles, based on web service metadata 108. Table component 110 also applies other properties of the columns in the table include (e.g., whether the data in that column is editable, whether it is required or cannot be empty, etc. As a result, an administrator user need not make changes to table component 110, and the business user need not make changes to the attributes of the presented information. In some implementations, the system may enable a user such as an administrator user to make some changes to the attributes of table component 110 (e.g., modifying a displayed header, etc.).

Referring still to FIG. 2, at block 208, the system retrieves (payload) data from web service 104. Example implementations are described in more detail herein in connection with FIG. 4.

At block 210, the system converts the data to a predetermined format. In various implementations, the predetermined format is a format that is acceptable to the spreadsheet and is human readable. Example implementations are described in more detail herein in connection with FIG. 4.

Referring still to FIG. 2, at block 212, the system tracks data changes in spreadsheet 112 based on user input. In some implementations, the user may pull data into spreadsheet 112 and then edit the data. For example, the user may add, delete, change or alter data, etc.

In various implementations, client device 102 sends a request to web service 104 requesting data, and web service 104 responds to client device 102 by sending the requested data to client device 102. In various implementations, data that is imported or populated into spreadsheet 112 may be sourced by various databases that supply data to different fields of spreadsheet 112. In various implementations, these databases may pass such data through web service 104 to client device 102.

At block 214, the system sends the data changes from spreadsheet 112 to web service 104. Referring still to FIG. 3, in some implementations, spreadsheet 112 may include an upload changes button 306 for uploading the data changes from spreadsheet 112 to web service 104. Example implementations are described in more detail herein in connection with FIG. 8.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 4 illustrates an example flow diagram for downloading data to a spreadsheet, according to some implementations. As described in more detail herein, this flow generally describes operations of a runtime phase, where the system receives data from a web service, converts the data, and presents the data to the user in a spreadsheet. In various implementations, the system converts the data from web service encoding to spreadsheet encoding as well as translates ID values to display values during download operations. This flow diagram may correspond to and provide example details for block 208 of FIG. 2, where the system retrieves (payload) data from web service 104.

At block 402, a system such as client device 102 requests data from web service 104. As indicated above, the system may provide a download data button (e.g., download data button 304 of FIG. 3) for downloading data from web service 104. In response to the user selecting download data button 304, the system proceeds to request data from web service 104.

At block 404, the system receives responses from the web service. The responses include (payload) data to be imported to a spreadsheet.

FIG. 5 illustrates example payload employee data retrieved from a web service, according to some implementations. Shown is a set of employee data, which is in a JavaScript Object Notation (JSON) format. As shown, some of the data is not in a human readable format. In other words, a user would not be able to intuitively understand what some of the data means. For example, "DepartmentID" in one example has a value of "90." The user probably would not understand what "90" means.

FIG. 6 illustrates example payload job data retrieved from a web service, according to some implementations. Shown is a set of job data, which is in a JSON format.

At block 406, the system parses data from the web service responses.

At block 408, the system converts values from the data to a predetermined format. In various implementations, the predetermined format is a form that is acceptable to the spreadsheet, in that the system converts values of the data from web service encoding to/from spreadsheet encoding.

At block 410, the system populates the spreadsheet with converted values, which involves heavy lifting with a spreadsheet application programming interface (API).

FIG. 7 illustrates example fields of a spreadsheet with converted display values, according to some implementations. As shown, the HireDate JSON string values (e.g., 2003-06-17, etc.) are converted into spreadsheet date values (e.g., 6/17/2003, etc.). Also, the JobID JSON string values (e.g., AD_PRES, etc.) are converted into spreadsheet text values (e.g., President, etc.). The Salary JSON number value (e.g., 24000, etc.) is converted into a spreadsheet number (double) value (e.g., 24,000.00, etc.). The DepartmentID JSON string values (e.g., 90, etc.) are converted into spreadsheet text values (e.g., Executive, etc.).

Figure 8:
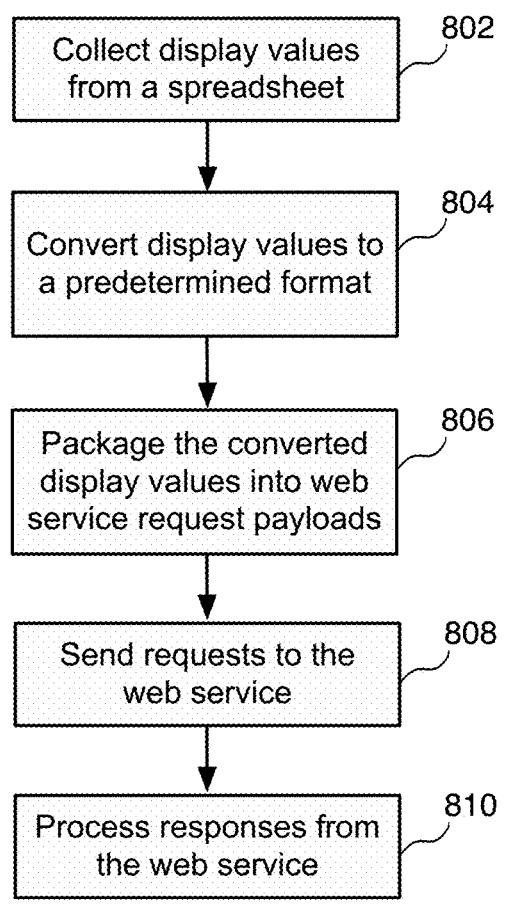
FIG. 8 illustrates an example flow diagram for uploading data from a spreadsheet, according to some implementations.

FIG. 8 illustrates an example flow diagram for uploading data from a spreadsheet, according to some implementations. As described in more detail herein, this flow generally describes operations of a runtime phase, where the system accesses data presented in a spreadsheet, converts the data, and sends the converted data to a web service. This flow diagram may correspond to and provide example details for block 214 of FIG. 2, where the system sends (payload) data changes to web service 104.

At block 802, a system such as client device 102 collects display values from a spreadsheet (heavy lifting with the spreadsheet API). In various implementations, the system may provide an upload changes button (e.g., upload changes button 306) for uploading the data changes from spreadsheet 112 to web service 104.

In various implementations, after a user makes changes to data in the spreadsheet, the user may select (e.g., click) upload changes button 306, which causes the system to send the data changes from spreadsheet 112 to web service 104, where spreadsheet 112 is bound to web service 104. In various implementations, the system converts the data from spreadsheet encoding to web service encoding as well as translates display values to ID values during upload operations.

FIG. 9 illustrates example fields of a spreadsheet with changed display values, according to some implementations. As shown in this example implementation, the user has modify cell values for an employee (e.g., Daniel Faviet), where the Hire Date is changed to "9/5/2005," the Job Title is changed to Accounting Manager, and the Salary is changed to "10,000.53." For ease of illustration, not all fields are shown. Also shown is an update indicator 902, which indicates to the user that one or more of the fields in the spreadsheet have been updated.

At block 804, the system converts the display values from the data to a predetermined format. In various implementations, the predetermined format is a format that is acceptable to a particular web service. The particular format may vary, and will depend on the particular implementation.

At block 806, the system packages the converted display values into web service request payloads.

FIG. 10 illustrates an example package of converted display values in a JSON format, according to some implementations. As shown, the Hire Date spreadsheet date value (e.g., 9/5/2005) is converted into JSON string values (e.g., 2005-09-05). Also, the Job Title text values (e.g., Accounting Manager) are converted to JSON string values (e.g., AC_MGR). The Salary number value (e.g., 10,000.53) is converted into a JSON number value (e.g., 10000.53).

At block 808, the system sends requests to the web service, where the requests include the web service request payloads. In various implementations, by sending the data changes from spreadsheet 112 to web service 104, the system causes web service 104 to then provide the data changes in the spreadsheet to a business application. As a result, the system automatically integrates spreadsheet 112 with web service 104. In various implementations, spreadsheet 112 is an integrated spreadsheet that is integrated with (or bound to) web service 104, where spreadsheet 112 has a unique table component that maps attributes, fields, and associated properties with columns and cells of spreadsheet 112.

At block 810, the system processes responses from the web service. If successful, a response associated with one or more changes indicates that the changes were applied successfully via web service request.

FIG. 11 illustrates example fields of the spreadsheet of FIG. 9 with changed display values and an update succeeded indicator 1102, according to some implementations. The fields are the same as in FIG. 9 except that the update indicator in the Change field is gone, and the system is displaying an update succeeded indicator 1102 in the Status field. If the update is not successful at the web service, the system indicates in the Status field as such (e.g., "update failed").

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 12:
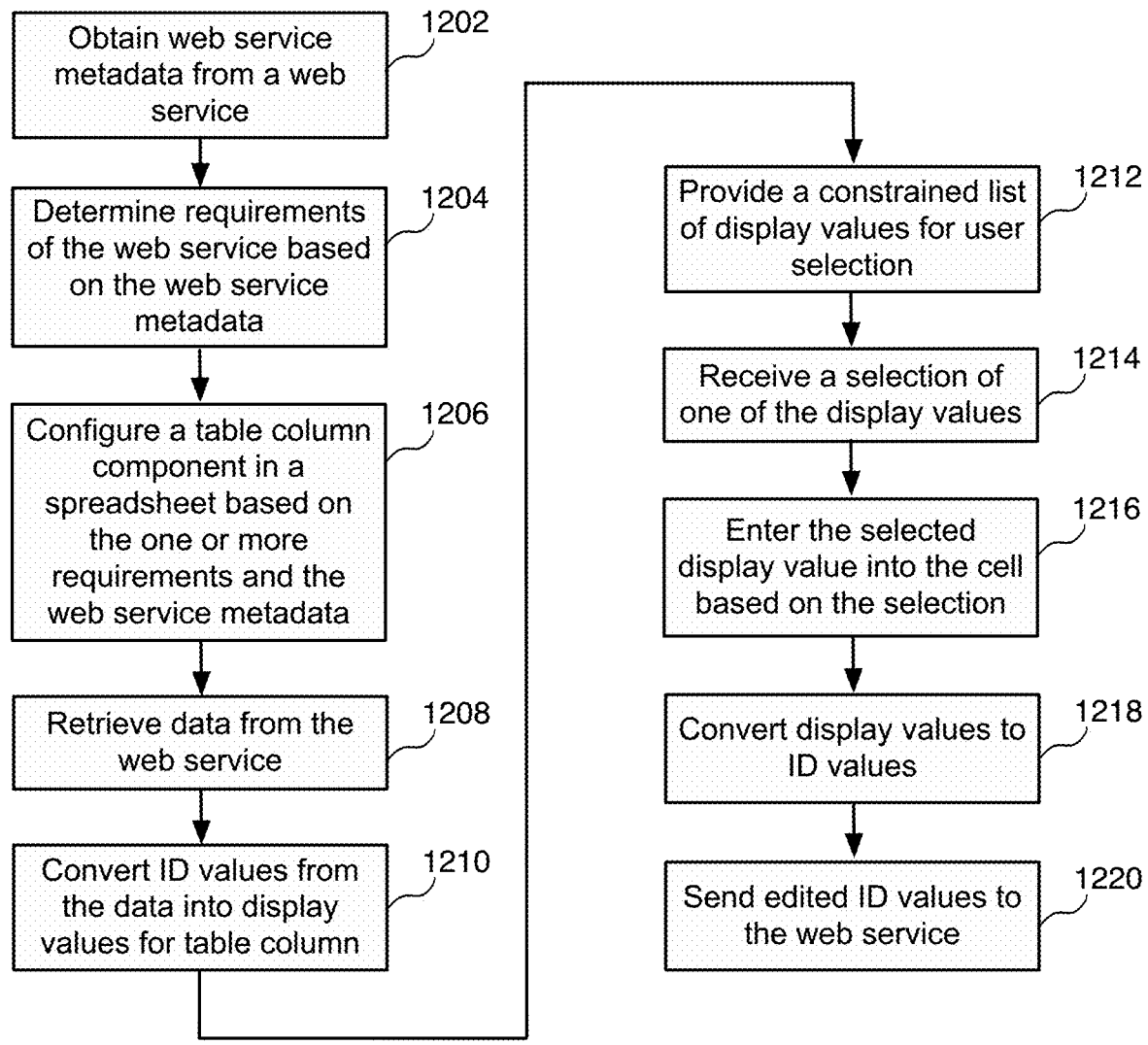
FIG. 12 illustrates an example flow diagram for providing a constrained list of display values in a spreadsheet, according to some implementations.

FIG. 12 illustrates an example flow diagram for providing a constrained list of display values in a spreadsheet, according to some implementations. As described in more detail herein, implementations provide a business user with a limited set of values for a user to select when entering values into cells of a spreadsheet.

Referring to both FIGS. 1 and 12, at block 1202, a system such as client device 102 obtains web service metadata 108 from web service 104. As indicated herein, in some implementations, client device 102 may contact web service 104 via a URL (e.g., entered by a user in an API URL, etc.), and interrogate web service 104 to obtain web service metadata 108. As indicated herein, in some implementations, web service 104 may be a representational state transfer (REST) service.

At block 1204, the system determines one or more requirements of web service 104 based on web service metadata 108. In various implementations, the system analyzes web service metadata 108 to determine these requirements. Requirements may include, for example, a constrained list of display values that are allowed for one or more attributes that web service 104 can provide.

As indicated herein, in various implementations, attributes or fields may be associated with an employee. Example attributes or fields may include employee ID, first name, last name, email, phone number, hire date, job title, salary, commission percentage, manager, department, etc. As indicated herein, the terms attribute and field may be used interchangeably. In various implementations, attributes may have particular properties that govern the behavior of the attributes. For example, properties may include whether an attribute is required or optional, what data types are required for an attribute, etc.

In various implementations, the corresponding field names and displayed header labels for these attributes or fields may differ. For example, the corresponding field names or business object field names may be: employeeId, FirstName, LastName, Email, PhoneNumber, HireDate, JobId, Salary, CommissionPct, ManagerId, DepartmentId, etc. The corresponding header labels may be: Id*, First Name, Last Name*, Email*, Phone #, Hire Date*, Job Title*, Salary, Commission %, Manager Id, Department, etc. Accordingly, the header label may be more easily readable to a user than the actual field name.

In various implementations, metadata 108 describes how attributes are mapped to constrained lists of values. For attributes mapped to a constrained list of display values, some implementations may covert (translate/map) a code or ID data value to a more meaningful (to the end-user) display value, as will be described in more detail below.

FIG. 13 illustrates two examples of constrained lists of display and ID values in a portion of a spreadsheet 1300, according to some implementations. Shown is a list of display values 1302 that correspond to the job code attribute. As shown, there is a particular number of job codes. Also, the job codes in this list of display values 1302 are in a particular text format or code (e.g., AD_PRES, AD_VP, AD_ASST, etc.). The limited number of job codes and the particular format are requirements indicated in the metadata.

Also shown is a list of (job title) values 1304 (e.g., President, Administration Vice President, Administration Assistant, etc.), where the items in the list of display values 1304 correspond to the items in the list of (job code) data values 1302. For example, President corresponds to AD_PRES, Administration Vice President corresponds to AD_VP, Administration Assistant corresponds to AD_ASST, etc. The display values are easier for a user to read, and are displayed in a spreadsheet in a UI for the user to read.

In another example, data values 1306 that correspond to the department ID attribute is shown. Also shown is a corresponding list of (department name) display values 1308. As shown, Administration corresponds with 10, Marketing corresponds with 20, Purchasing corresponds with 30, etc. In some implementations, these mappings of display values to data or ID values may be stored in a hidden worksheet.

These lists may be referred to as constrained lists of values. As described in more detail herein, when the system provides a constrained list of display values to a user. In some implementations, the data values may come from one source via the web service and the display values may come from a different source via the web service. In some implementations, when data is retrieved from the web service, the system translates the data (code) values into the corresponding display values for the end-user to see and select. Likewise, when sending data changes back to the web service, the system translates the chosen display values to data values for consumption by the web service.

As described in more detail herein, various implementations leverage such requirements in the metadata to automatically provide a user such as a business user with a list of selectable values to be entered in particular cells of a spreadsheet. This capability is provided to the business user with no need for programming.

At block 1206, the system configures a table column component 120 in spreadsheet 112 based on the one or more requirements of web service 104, which are indicated in web service metadata 108. The system automatically configures the table column components in an editable table component in the spreadsheet based on the metadata. In various implementations, the column component retrieves the list of valid data values and corresponding display values from the web service for table columns whose attribute values are constrained to a list of allowable data values. The system determines the relationships between attributes and maps the attributes to table columns and the constrained lists, and constrains the display values for those attributes. For example, the system may configure table column component 120 to map attributes such as job code and department ID to particular columns in the spreadsheet. Also, the system may also configure table column component 120 to map the constrained list of display values and corresponding display values of job titles to the job code attribute. Similarly, the system may configure table column component 120 to map the constrained list data values to the corresponding display values of department names to the department ID attribute.

At block 1208, the system retrieves data from the web service.

At block 1210, the system converts (translates/maps) ID values from the data into display values for a table column.

Figure 14:
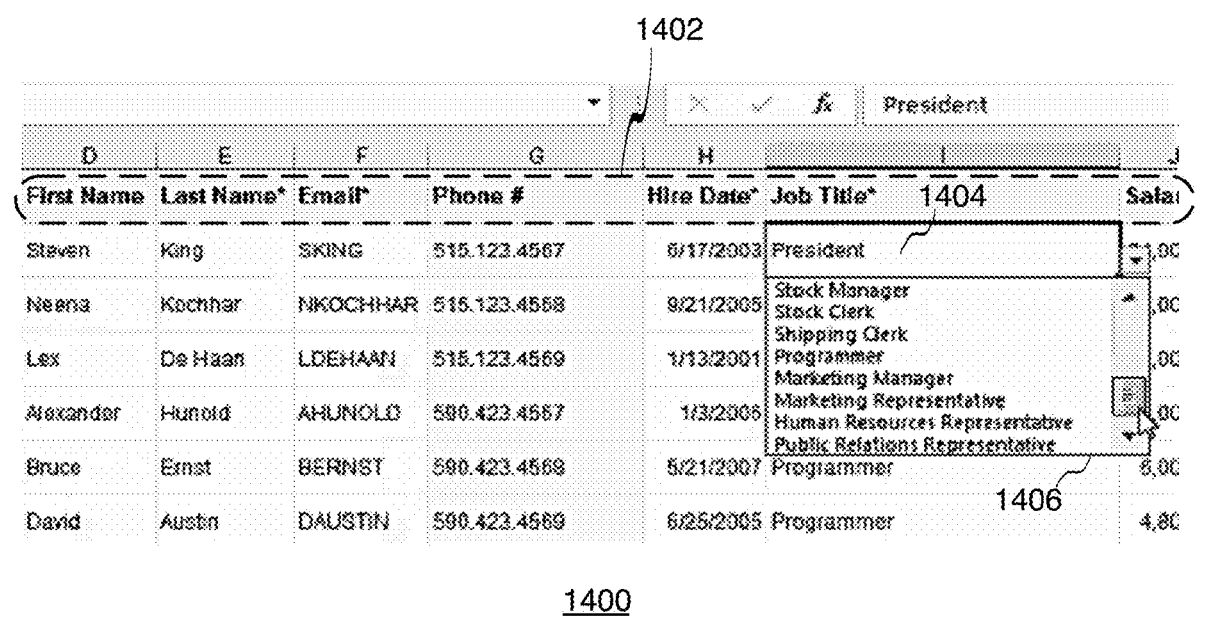

FIG. 14 illustrates example portion of a spreadsheet 1400, according to some implementations. Shown are header labels 1402 First Name, Last Name*, Email*, Phone #, Hire Date*, Job Title*, etc. This particular example focuses on the job code attribute. Referring to the corresponding column with the header Job Title*, the user can enter job titles for each employee in the cells of the spreadsheet. When the user selects or clicks on a particular cell 1404, the system detects the selection.

At block 1212, the system provides a constrained list of display values for user selection, in response to the user selecting a particular cell such as cell 1404 of FIG. 14. In some implementations, the constrained list of display values may be presented or rendered in a drop-down menu such as drop-down menu 1406, where the user can select a value from the list in the drop-down menu. While some example implementations are described in the context of drop-down menus, the particular presentation of the list of display values may vary depending on the particular implementation. For example, in some implementations, the system may display a popup dialog that allows the user to search for items in the constrained list and select from the list. In another example implementation, the system may utilize attributes constrained to a list of display values, where the size of the list is quite large (making a drop-down menu UI ill-suited). In some implementations, the system may allow for manual entry of display values for making edits, where the translation to data (code) values is still operative during upload (and vice/versa during download).

As indicted herein, in various implementations, the table column component automatically constrains the list of display values that are displayed and that may be selected from the cells. In other words, columns in tabular data may have a constrained list of allowable values. When editing these columns, the user is only permitted to choose from that constrained list of display values. In this particular example shown, the user has selected the job title President from the constrained list of display values (e.g., from drop-down menu 1406).

Figure 15:
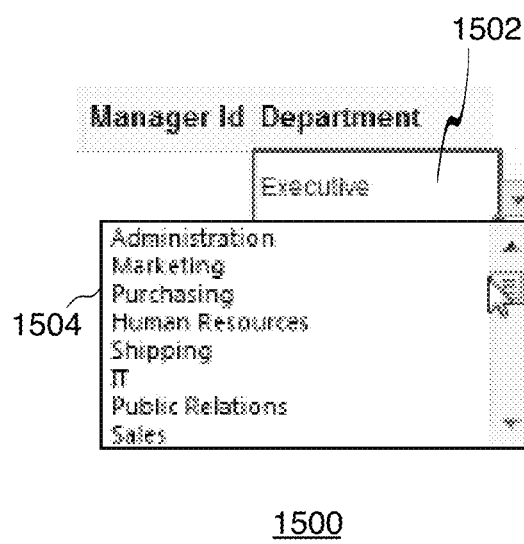
FIG. 15 illustrates example portion of a spreadsheet, according to some implementations.

FIG. 15 illustrates example portion of a spreadsheet 1500, according to some implementations. Shown is a header label Manager Id and Department. This particular example focuses on the department attribute. Referring to the corresponding column with the header Department, the user can enter department names for each employee in the cells of the spreadsheet. In response to the user selecting cell 1502, the system provides a constrained list of (department name) display values in a drop-down menu 1504. In this particular example, the user selected Executive. While some example implementations are described herein in the context of a single cell associated with a single column, these implementations also apply to multiple cells and multiple columns, depending on the particular implementation.

As shown, the constrained list shown is a list of display values, as opposed to a list of data values, as the list of display values are easier for the user to read. Providing the list of display values and enabling the user to select one of the choices reduces or eliminates the risk of error on the part of the user.

At block 1214, the system receives a selection of one of the display values from the constrained list of display values. In the example of FIG. 14, the user selected President from the constrained list of (department name) display values. In the example of FIG. 15, the user selected Executive from the constrained list of (job title) display values.

At block 1216, the system enters the selected display value into the cell based on the selection made by the user. In the example of FIG. 14, because the user selected President, the system enters President in cell 1404. In the example of FIG. 15, the user selected Executive, the system enters Executive in cell 1502.

In these examples, the values from the list of constrained values may be referred to as display values, in that the values are displayed in the spreadsheet for user selection. The display values that are entered into cells of the spreadsheet are constrained to a list of allowable values.

At block 1218, the system converts display values to ID values.

At block 1220, the system sends edited ID values to the web service. In some implementations, the system sends the data value that corresponds to the display value back to the web service. In various implementations, table column component 120 maps a selected display value to a corresponding data value, and then sends the data value back to web service 104. For example, if the user selects (job title) President, the system sends the (job code) data value AD_PRES to the web service. In another example, if the user selects (department name) Executive, the system sends the (department) data value 90 to the web service. In some implementations, two or more selected displayed values may be mapped to a single data value, where the single data value is sent or posted to the web service. By limiting the possible data entries for the user and assisting the user in entering values in the appropriate cells, and sending the correct corresponding data values to the web service, the system reduces the risk of data entry errors.

Implementations described herein enable business users with no previous programming experience to rapidly integrate spreadsheets with web applications in order to retrieve, analyze, and edit data for table columns constrained to a specific list of choices. It allows the business users to create and use ad-hoc graphical user interfaces (GUIs) in a spreadsheet without any dependency on web application development teams to create the GUI. Implementations enable a GUI to constrain certain columns to show and allow choices from a constrained list of display values. This reduces data entry errors by presenting the user with only the list of allowable choices for that column's cells.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable users with no previous programming experience to rapidly integrate spreadsheets with web applications in order to retrieve, analyze, and edit data. Implementations also enable users to create and use ad-hoc graphical user interfaces (GUIs) in a spreadsheet without any dependency on web application development teams to create the GUI. Furthermore, implementations provide a business user with selectable values for particular cells of a spreadsheet. Implementations also reduce the net cost of such data entry tasks. Implementations also enable users with no previous programming experience to rapidly integrate spreadsheets with web applications in order to retrieve, analyze, and edit data. Implementations also enable users to create and use ad-hoc graphical user interfaces (GUIs) in a spreadsheet without any dependency on web application development teams to create the GUI.

Figure 16:
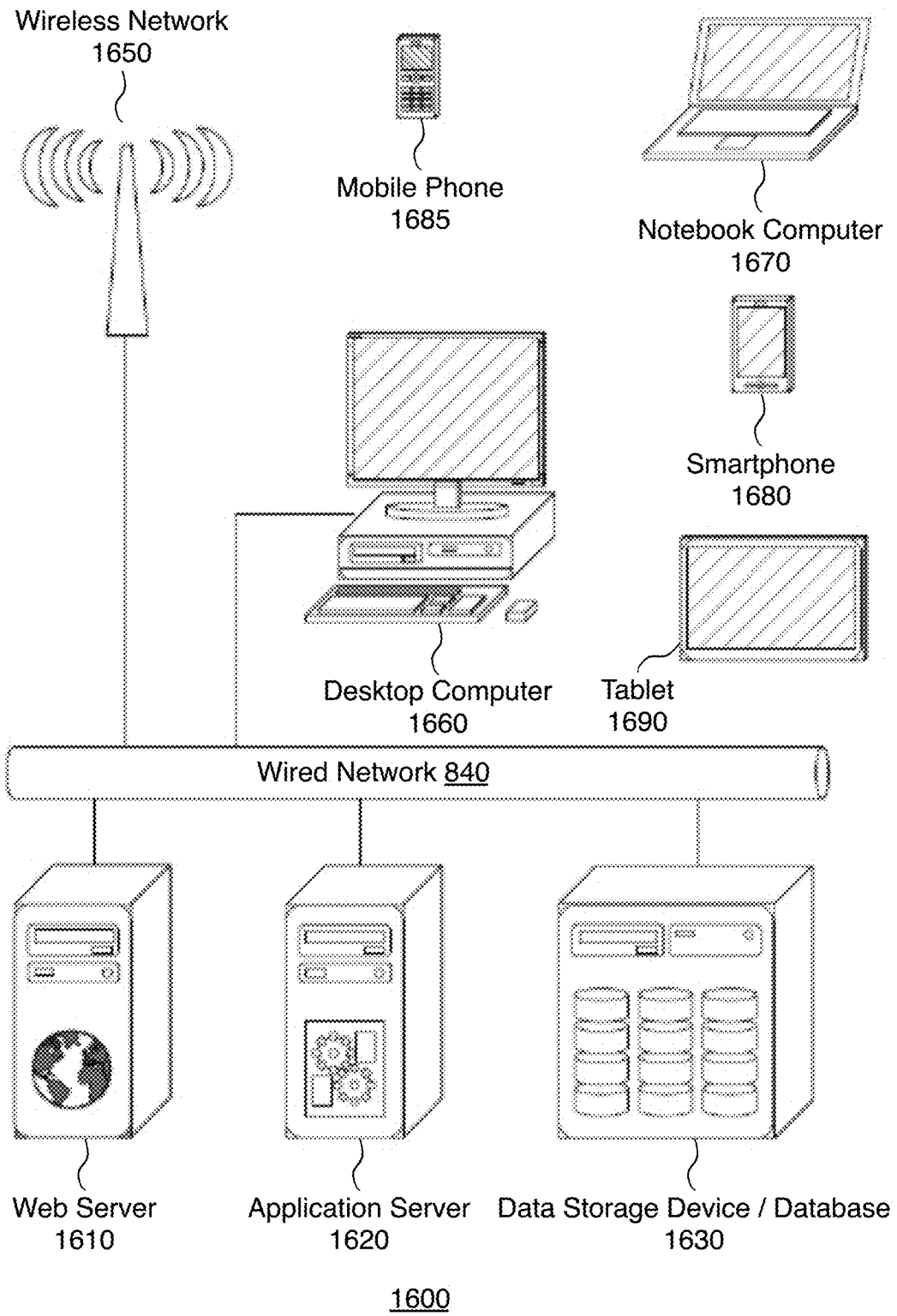
FIG. 16 illustrates a block diagram of an example system, which may be used for implementations described herein.

FIG. 16 illustrates a block diagram of an example system 1600, which may be used for implementations described herein. Example system 1600 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 1600 performs implementations described herein, in other implementations, any suitable component or combination of components associated with system 1600 or any suitable processor or processors associated with system 1600 may facilitate performing the implementations described herein. In various implementations, system 1600 may not have all of the components shown and/or may have other elements including other types of components instead of, or in addition to, those shown herein.

General system 1600 includes user devices 1660-1690, including one or more desktop computers 1660, one or more notebook computers 1670, one or more smart-phones 1680, one or more mobile phones 1685, and one or more tablets 1690. General system 1600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1600 is shown with five user devices, any number of user devices can be supported.

A web server 1610 is used to process requests from web browsers and standalone applications for web pages, electronic documents, enterprise data or other content, and other data from the user computers. Web server 1610 may also provide push data or syndicated content, such as RSS feeds, of data related to enterprise operations.

An application server 1620 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1620 are adapted to process input data and user computer requests and can store or retrieve data from data storage device or database 1630. Database 1630 stores data created and used by the data applications. In some implementations, database 1630 includes a relational database that is adapted to store, update, and retrieve data in response to SQL format commands or other database query languages. Other implementations may use unstructured data storage architectures and Not Only SQL (NoSQL) databases.

In some implementations, application server 1620 includes one or more general-purpose computers capable of executing programs or scripts. In some implementations, web server 1610 is implemented as an application running on the one or more general-purpose computers. Web server 1610 and application server 1620 may be combined and executed on the same computers.

An electronic communication network 1640-1650 enables communication between user computers 1660-1690, web server 1610, application server 1620, and database 1630. In some implementations, networks 1640-1650 may further include any form of electrical or optical communication devices, including wired network 1640 and wireless network 1650. Networks 1640-1650 may also incorporate one or more local-area networks, such as an Ethernet network, wide-area networks, such as the Internet; cellular carrier data networks; and virtual networks, such as a virtual private network.

System 1600 is one example for executing applications according to some implementations. In some implementations, application server 1610, web server 1620, and optionally database 1630 can be combined into a single server computer application and system. In further implementations, virtualization and virtual machine applications may be used to implement one or more of application server 1610, web server 1620, and database 1630.

In still further implementations, all or a portion of the web and application serving functions may be integrated into an application running on each of the user computers. For example, a JavaScript application on the user computer may be used to retrieve or analyze data and display portions of the applications.

In various implementations, system 1600 may not have all of the components shown and/or may have other elements including other types of components instead of, or in addition to, those shown herein.

Figure 17:
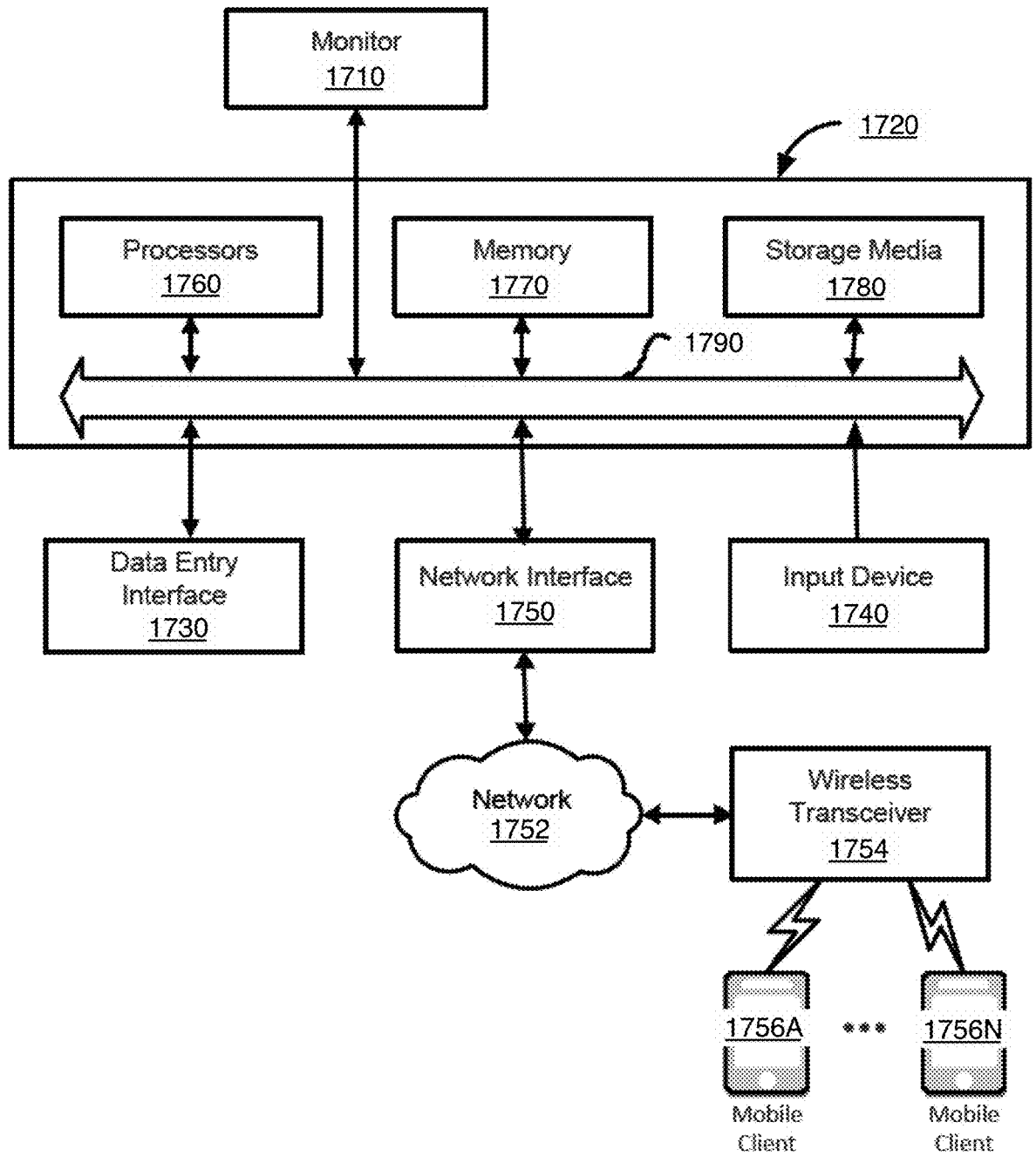
FIG. 17 illustrates a block diagram of an example network environment, which may be used for implementations described herein.

FIG. 17 illustrates a block diagram of an example network environment 1700, which may be used for implementations described herein. Network environment 1700 is merely illustrative and not intended to limit the scope of the claims. One of ordinary skill in the art would recognize other variations, modifications, and alternatives. For example, network environment 1700 may be implemented in a distributed client-server configuration having one or more client devices in communication with one or more server systems.

In one exemplary implementation, network environment 1700 includes a display device such as a monitor 1710, a computer 1720, a data entry interface 1730 such as a keyboard, touch device, and the like, an input device 1740, a network interface 1750, and the like. Input device 1740 is typically implemented as a computer mouse, a trackball, a track pad, wireless remote, tablet, touch screen, and the like. Moreover, input device 1740 typically allows a user to select and operate objects, icons, text, characters, and the like that appear, for example, on the monitor 1710.

Network interface 1750 may include an Ethernet card, a modem (telephone, satellite, cable, integrated services digital network (ISDN), etc.), an asynchronous digital subscriber line (DSL) unit, and the like. Furthermore, network interface 1750 may be physically integrated on the motherboard of computer 1720, may be a software program, such as soft DSL, or the like.

Network environment 1700 may also include software that enables communications over communication network 1752 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 1752 may include a local area network, a wide area network, a wireless network, an Intranet, the Internet, a private network, a public network, a switched network, or any other suitable communication network, such as for example cloud networks. Communication network 1752 may include many interconnected computer systems and any suitable communication links such as hardwire links, optical links, satellite or other wireless communications links such as Bluetooth, WIFI, wave propagation links, or any other suitable mechanisms for communication of information. For example, communication network 1752 may communicate to one or more mobile wireless devices 1756A-N, such as mobile phones, tablets, and the like, via a base station such as wireless transceiver 1754.

Computer 1720 may include familiar computer components such as one or more processors 1760, and memory storage devices, such as a memory 1770, e.g., random access memory (RAM), storage media 1780, and system bus 1790 interconnecting the above components. In one embodiment, computer 1720 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1720 performs implementations described herein, in other implementations, any suitable component or combination of components associated with computer 1720 or any suitable processor or processors associated with computer 1720 may facilitate performing the implementations described herein. In various implementations, computer 1700 may not have all of the components shown and/or may have other elements including other types of components instead of, or in addition to, those shown herein.

Memory 1770 and Storage media 1780 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore, various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the program instructions when executed by one or more processors of a client computing device cause the one or more processors to perform operations comprising:
   obtaining web service metadata from a web service;
   determining spreadsheet attributes of the web service based on the web service metadata;

configuring, by the client computing device, a table component in the spreadsheet based on the spreadsheet attributes;

retrieving, by the client computing device, data from the web service including a data value in a web service encoded format;

converting, by the client computing device, the data value to a corresponding display value in a spreadsheet encoding format by using mappings of display values to data values, wherein the mappings are stored in the spreadsheet;

converting, by the client computing device, user inputted data changes of the display value in the spreadsheet, to a corresponding data value in the web service encoded format by using the mappings; and sending the converted data changes from the spreadsheet to the web service.

2. The computer-readable storage medium of claim 1, wherein the corresponding data value is a non-human readable format and the display value is a human readable format.

3. The computer-readable storage medium of claim 1, wherein the mappings are stored in a hidden worksheet of the spreadsheet.

4. The computer-readable storage medium of claim 1, wherein the data from the web service is sourced from a plurality of databases to the web service for populating fields of the spreadsheet.

5. The computer-readable storage medium of claim 4, wherein the web service is a representational state transfer (REST) service.

6. The computer-readable storage medium of claim 1, wherein the mappings include that at least two display values are mapped to a single data value.

7. The computer-readable storage medium of claim 1, wherein the table component maps attributes, fields, and associated properties with columns and cells of the spreadsheet.

8. A computer-implemented method for editing a spreadsheet by a client computing device, the method comprising:

obtaining web service metadata from a web service;

determining spreadsheet attributes of the web service based on the web service metadata;

configuring, by the client computing device, a table component in the spreadsheet based on the spreadsheet attributes;

retrieving, by the client computing device, data from the web service including a data value in a web service encoded format;

converting, by the client computing device, the data value to a corresponding display value in a spreadsheet encoding format by using mappings of display values to data values, wherein the mappings are stored in the spreadsheet;

converting, by the client computing device, user inputted data changes of the display value in the spreadsheet, to a corresponding data value in the web service encoded format by using the mappings; and sending the converted data changes from the spreadsheet to the web service.

9. The method of claim 8, wherein the corresponding data value is a non-human readable format and the display value is a human readable format.

10. The method of claim 8, wherein the mappings are stored in a hidden worksheet of the spreadsheet.

11. The method of claim 8, wherein the data from the web service is sourced from a plurality of databases to the web service for populating fields of the spreadsheet.

12. The method of claim 11, wherein the web service is a representational state transfer (REST) service.

13. The method of claim 8, wherein the mappings include that at least two display values are mapped to a single data value.

14. The method of claim 8, wherein the table component maps attributes, fields, and associated properties with columns and cells of the spreadsheet.

15. A system comprising:

one or more processors of a client computing device; and logic encoded in one or more non-transitory computer-readable storage media for execution by the one or more processors and when executed operable to perform operations comprising:

obtaining web service metadata from a web service;

determining spreadsheet attributes of the web service based on the web service metadata;

configuring, by the client computing device, a table component in the spreadsheet based on the spreadsheet attributes;

retrieving, by the client computing device, data from the web service including a data value in a web service encoded format;

converting, by the client computing device, the data value to a corresponding display value in a spreadsheet encoding format by using mappings of display values to data values, wherein the mappings are stored in the spreadsheet;

converting, by the client computing device, user inputted data changes of the display value in the spreadsheet, to a corresponding data value in the web service encoded format by using the mappings; and sending the converted data changes from the spreadsheet to the web service.

16. The system of claim 15, wherein the corresponding data value is a non-human readable format and the display value is a human readable format.

17. The system of claim 15, wherein the mappings are stored in a hidden worksheet of the spreadsheet.

18. The system of claim 15, wherein the web service is a representational state transfer (REST) service and the data from the web service is sourced from a plurality of databases to the REST web service for populating fields of the spreadsheet.

19. The system of claim 15, wherein the mappings include that at least two display values are mapped to a single data value.

20. The system of claim 15, wherein the table component maps attributes, fields, and associated properties with columns and cells of the spreadsheet.

* * * * *